Figure 1:
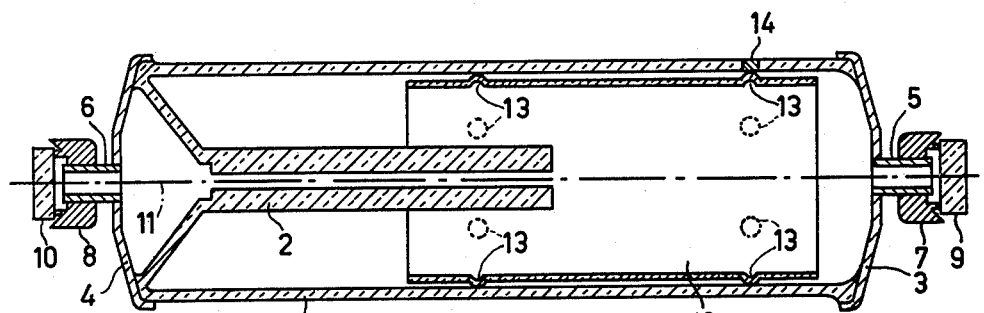

United States Patent [19]

van den Brink

[11] 4,351,053
[45] Sep. 21, 1982

[54] GAS DISCHARGE LASER

[75] Inventor: Hans G. van den Brink, Eindhoven, Netherlands

[73] Assignee: U.S. Philips Corporation, New York, N.Y.

[21] Appl. No.: 99,294

[22] Filed: Dec. 3, 1979

[30] Foreign Application Priority Data

Dec. 19, 1978 [NL] Netherlands ................. 7812287

[51] Int. Cl.³ .............................................. H01S 3/03
[52] U.S. Cl. ..................................................... 372/61
[58] Field of Search ................. 331/94.5 G, 94.5 D, 331/94.5 C, 94.5 PE, 94.5 P

[56] References Cited

U.S. PATENT DOCUMENTS 3,447,098  5/1969  Eckberg ................. 331/94.5 D
3,543,182 11/1970  Witterman et al. ...... 331/94.5 D
4,081,762  3/1978  Golser et al. .......... 331/94.5 D
4,238,743 12/1980  Golser et al. .......... 331/94.5 D
4,240,045 12/1980  Golser ................. 331/94.5 D Primary Examiner—William L. Sikes
Assistant Examiner—Léon Scott, Jr.
Attorney, Agent, or Firm—Robert T. Mayer; Bernard Franzblau

[57] ABSTRACT

A gas discharge laser including at least one electrode consisting of a rolled metal foil which is clamped in the tubular envelope of the laser. Spacers are provided between the foil and the inner wall of the envelope at regular distances from each other and may consist, inter alia, of pits depressed in the metal foil so that a rotationally symmetrical heat transfer from the electrode to the envelope is obtained. A thermally stable laser thus is obtained in which the generated laser beam has a substantially constant direction.

15 Claims, 4 Drawing Figures

GAS DISCHARGE LASER

The invention relates to a gas discharge laser comprising a tubular glass envelope with two electrodes, of which at least one consists of a rolled metal foil resiliently engaging the envelope.

Such a gas discharge laser is known from U.S. Pat. No. 3,543,182 in which a construction is described in which rolled metal foils are inserted into the envelope forming the discharge tube of the laser, after which they are released and resiliently bear against the inner wall of the envelope. In contrast with constructions as described in U.S. Pat. Nos. 3,616,027, 3,801,929 and 3,942,133 in which cylindrical electrodes are secured in the envelope by means of springs, pins or other connection means, such a construction is simple and cheap. A disadvantage, however, is that such electrodes consisting of resiliently bearing foils cannot be used in a laser in which the direction of the generated beam must be very constant. It has been found that lasers having such a foil electrode as a cathode exhibit a thermal instability which manifests itself as a continuous change in the direction of the generated laser beam.

It is therefore an object of the invention to provide a laser in which such a metal foil cathode can be used without resulting in thermal instability and in which the beam emanates from the laser in a substantially constant direction.

According to the invention, a gas discharge laser of the kind described in the opening paragraph is characterized in that the laser comprises spacing means at predetermined locations so that the foil engages the envelope only at said spacing means and the remainder of the foil is circumferentially substantially uniformly spaced from the inner wall of the envelope.

It has been found that, since the cathode no longer engages the glass in a very undefined manner, the laser is thermally much more stable so that now a change of the direction of the generated laser beam during operation of the laser does not take place. This is because the heat transfer from the electrode to the envelope by radiation is substantially rotationally symmetrical and the heat transfer by conduction takes place only via the spacing means.

In a first embodiment of the invention the spacing means comprise local outward projections of the foil formed by locally indenting the inner surfaces of the foil.

In a second embodiment of the invention the spacing means comprise outwardly projecting circumferential ridges in the foil formed by pressing grooves in the inner surface of the foil.

In the said U.S. Pat. No. 3,543,182 the electrode presses against the inner wall of the envelope and an electrical leadthrough provided therein. In a gas discharge laser embodying the invention, an electrical connection may be made in an analogous manner in that at least one of the projections in the foil contacts an electrical leadthrough.

In another embodiment of the invention the spacing means comprise a number of bosses or projections extending inward on the inner wall of the envelope.

The projections may be, for example, a number of local projections or two circumferential ridges.

One of the projections in the inner wall of the envelope may also constitute an electrical leadthrough. It is, of course, also possible to produce electrical contact with the metal foil electrode in known manner by means of a contact spring or a wire connection.

Figure 2:
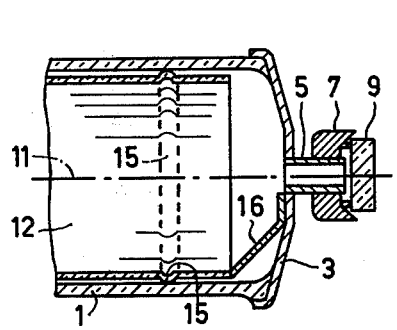
Figure 3:
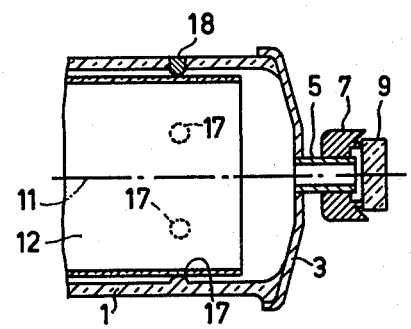
Figure 4:
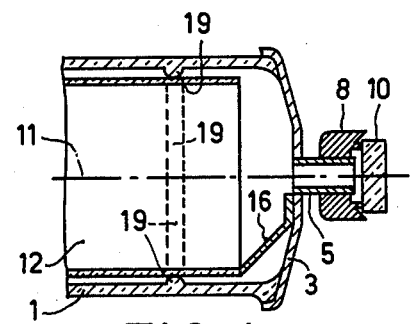

Embodiments of the invention will now be described by way of example and in greater detail with reference to the drawings, in which the same reference numerals are used for corresponding components, and in which:

FIG. 1 is a longitudinal sectional view of a gas discharge laser embodying the invention, and FIGS. 2 to 4 are longitudinal sectional views of parts of three alternative arrangements in lasers embodying the invention.

The laser shown in FIG. 1 comprises a tubular envelope 1 having therein a laser capillary 2. The envelope is closed at its two ends by means of metal end plates 3 and 4 respectively having central apertures in which two tube sections 5 and 6 respectively are secured and to which, in turn, two reflector supports 7 and 8 with respective reflectors 9 and 10 are secured. Said reflectors are multilayer mirrors which are situated with their optical axes on the axis 11 of the laser capillary and which together constitute the laser resonator. A gas mixture, for example a mixture of He and Ne, is present in the envelope 1. Moreover, a metal foil cathode 12 is present in the envelope. The anode is formed by end plate 4. The metal foil cathode 12 has two sets of local outward projections 13 which are situated at regular distances from each other around the circumference of the foil and which ensure that the remainder of the cathode does not engage the glass wall of the envelope and that a rotationally symmetrical heat transfer takes place. One of the projections presses against a metal electrical lead through 14 arranged in the wall of the envelope.

FIG. 2 is a sectional view of one end of a second gas discharge laser embodying the invention. The spacing means in this case consist of two circumferential ridges 15 in the cathode 12, only one of which ridges is shown in the Figure. The electrical connection of the cathode to the electric supply is carried out in this case via end plate 3 and a conductive strip 16.

FIG. 3 is a longitudinal sectional view of one end of another gas discharge laser embodying the invention. The spacing means consist of a number of local projections in the form of bumps or studs 17 which extend inwardly from the inner wall of the envelope and against which the cathode presses. One of the studs, namely metal stud 18, is also an electrical leadthrough.

FIG. 4 is a longitudinal sectional view of one end of a further gas discharge laser embodying the invention. The spacing means consist of a few coaxial ridges 19 on the inner wall of the envelope, only one of which ridges is shown in FIG. 4. The electrical connection to the cathode is carried out by a conductive strip 16 in the same manner as in FIG. 2.

As a result of the use of the invention, a laser becomes stable and hence suitable for use in a device for reading a record carrier by means of a laser beam, or for use in a device in which accurate welding operations are carried out by means of a laser beam.

The invention is not restricted to the use exclusively with a cathode. In, for example, a $CO_2$ laser the anode may also be contructed in the manner described.

What is claimed is:

1. In a gas discharge laser including a tubular glass envelope having at least one wall and enclosing a discharge space containing an active lasing gas, means defining a resonant cavity within the glass envelope, means including first and second spaced apart electrodes within the glass envelope for producing an electric discharge in the discharge space, and means for abstracting energy from within the glass envelope, the improvement comprising wherein at least one of said electrodes comprises a rolled metal foil resiliently urged towards said wall of the glass envelope, and spacing means positioned at predetermined locations so that the metal foil engages the glass envelope only at said spacing means whereby the remainder of the metal foil is circumferentially substantially uniformly spaced apart from the wall of the glass envelope thereby producing a circumferentially symmetrical uniform heat transfer between the metal foil electrode and the glass envelope.

2. A gas discharge laser as claimed in claim 1 wherein the metal foil has an inner surface and the spacing means comprise a plurality of local outward projections of the foil formed by locally indenting the inner surface of the metal foil.

3. A gas discharge laser as claimed in claim 2, wherein at least one of the spacing means contacts an electrical leadthrough in the wall of the envelope.

4. A gas discharge laser as claimed in claim 1, wherein the spacing means comprise outwardly-projecting circumferential ridges in the foil formed by pressing grooves in the inner surface of the foil.

5. A gas discharge laser as claimed in claim 1 wherein the spacing means comprise inward projections on the inner wall of the envelope.

6. A gas discharge laser as claimed in claim 5 wherein the projections comprise two circumferential ridges.

7. A gas discharge laser as claimed in claim 5 or 6, characterized in that one of the projections comprises an electrical leadthrough.

8. A gas discharge laser comprising, a tubular envelope having a longitudinal axis and containing an active lasing gas an optical resonator within the tubular envelope having an optical axis parallel to said longitudinal axis, means including first and second spaced apart electrodes within the tubular envelope for establishing an electric discharge in said gas, means for abstracting energy from the envelope, and wherein at least one of said electrodes comprises a tubular metal foil coaxially arranged within the tubular envelope and resiliently urged outwardly towards the inner wall of the tubular envelope, and spacing means circumferentially positioned at given locations so that the metal foil contacts the tubular envelope only at said spacing means so that a major axial portion of the metal foil is uniformly radially spaced apart from the inner wall of the tubular envelope and in heat transfer relationship therewith to produce a radially symmetrical heat transfer between the metal foil electrode and the tubular envelope.

9. A gas discharge laser as claimed in claim 8 further comprising a laser capillary tube within the tubular envelope and having a longitudinal axis that coincides with the optical axis of the optical resonator, and wherein said optical resonator includes a pair of mirrors located at opposite ends of the tubular envelope.

10. A gas discharge laser as claimed in claim 8 wherein the spacing means comprise a plurality of relatively small outward projections circumferentially spaced on the outer surface of the metal foil.

11. A gas discharge laser as claimed in claim 10 further comprising an electric lead-through in the wall of the tubular envelope so as to make electric contact with at least a part of the spacing means.

12. A gas discharge laser as claimed in claim 8 wherein the spacing means comprise first and second outwardly projecting circumferential ridges axially spaced on the outer surface of the metal foil.

13. A gas discharge laser as claimed in claim 8 wherein the spacing means comprise a plurality of inward projections on the inner wall of the tubular envelope.

14. A gas discharge laser as claimed in claim 8 wherein the spacing means comprise first and second inwardly projecting circumferential ridges axially spaced on the inner wall of the tubular envelope.

15. A gas discharge laser as claimed in claims 13 or 14 wherein a part of the spacing means includes an electric lead-through in the wall of the tubular envelope.

* * * * *

UNITED STATES PATENT AND TRADEMARK OFFICE
CERTIFICATE OF CORRECTION

PATENT NO. : 4,351,053
DATED : September 21, 1982
INVENTOR(S) : HANS G. VAN DEN BRINK It is certified that error appears in the above-identified patent and that said Letters Patent is hereby corrected as shown below:

Column 1, line 39, change "of" to --in--

In the Claims:

Claim 3, line 1, after "claim 2" insert --or 4--

Claim 8, line 3, after "gas" insert --,-- (comma)

Claim 11, line 1, "claim" should be --claims-- after "10" insert --or 12--

Signed and Sealed this

Thirtieth Day of October 1984

[SEAL]

Attest:

GERALD J. MOSSINGHOFF

Attesting Officer

Commissioner of Patents and Trademarks